United States Patent [19]

Nanba et al.

[11] Patent Number: 5,796,186
[45] Date of Patent: Aug. 18, 1998

[54] LINEAR MOTOR

[75] Inventors: Katsuhiro Nanba, Okazaki; Mitsutoshi Yagoto; Masamitsu Ishiyama, both of Toyokawa; Makoto Izawa, Kariya; Toshio Kitaoka; Yasuhiro Matsumoto, both of Toyokawa, all of Japan

[73] Assignee: Minolta Co., Ltd., Osaka, Japan

[21] Appl. No.: 624,085

[22] Filed: Mar. 29, 1996

[51] Int. Cl.$^6$ ................................. H02K 41/02
[52] U.S. Cl. ................................. 310/14; 310/12
[58] Field of Search ................... 310/12, 13, 14, 310/190, 192, 193

[56] References Cited

U.S. PATENT DOCUMENTS

| | | | |
|---|---|---|---|
| 3,829,746 | 8/1974 | Van et al. | 318/135 |
| 4,025,810 | 5/1977 | Field | 310/162 |
| 4,868,431 | 9/1989 | Karita et al. | 310/12 |
| 4,873,462 | 10/1989 | Harned | 310/49 R |
| 4,912,746 | 3/1990 | Oishi | 310/12 |
| 5,081,381 | 1/1992 | Naraski | 310/12 |
| 5,229,670 | 7/1993 | Kagawa | 310/12 |
| 5,691,582 | 11/1997 | Lucas et al. | 310/14 |

FOREIGN PATENT DOCUMENTS

| | | |
|---|---|---|
| 53-147219 | 12/1978 | Japan. |
| 62-207168A | 11/1987 | Japan. |
| 2-65656A | 6/1990 | Japan. |

*Primary Examiner*—Steven L. Stephen
*Assistant Examiner*—Judson H. Jones
*Attorney, Agent, or Firm*—Burns, Doane, Swecker & Mathis, LLP

[57] ABSTRACT

A single sided servo apparatus comprises a linear motor and a longitudinal carriage which is connected to the linear motor at one end thereof. The linear motor comprises a stator including field magnets arranged linearly and a movable piece including armature coils. The field magnets have a trapezoid-like magnetic flux distribution. An arrangement pattern of the field magnets has a relative tilted angle to an arrangement pattern of the armature coils, so that a free end of the carriage precedes the other end thereof connected to the linear motor. Then, the thrust has a small variation and generates a stable thrust of the servo apparatus.

26 Claims, 14 Drawing Sheets

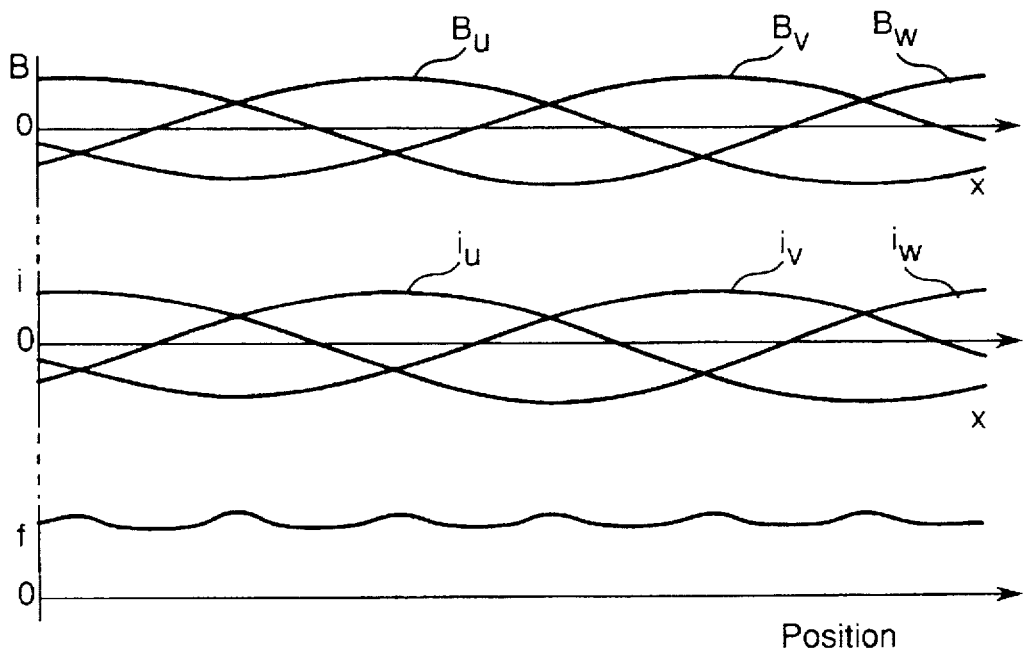
Fig.12 Comparison Example
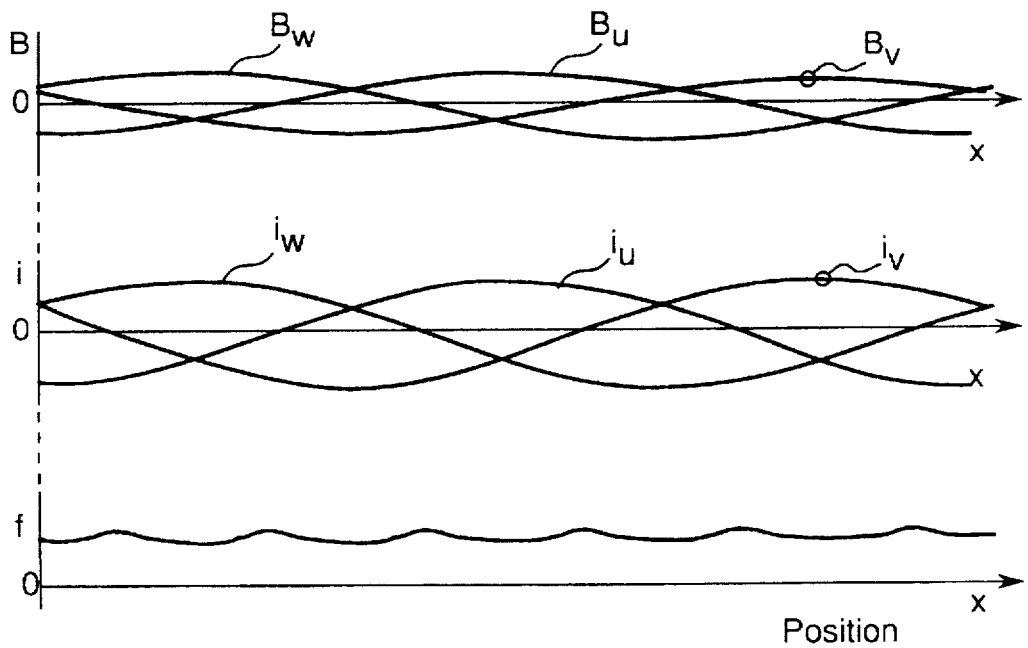
Fig.13

*Fig.17* Comparison Example
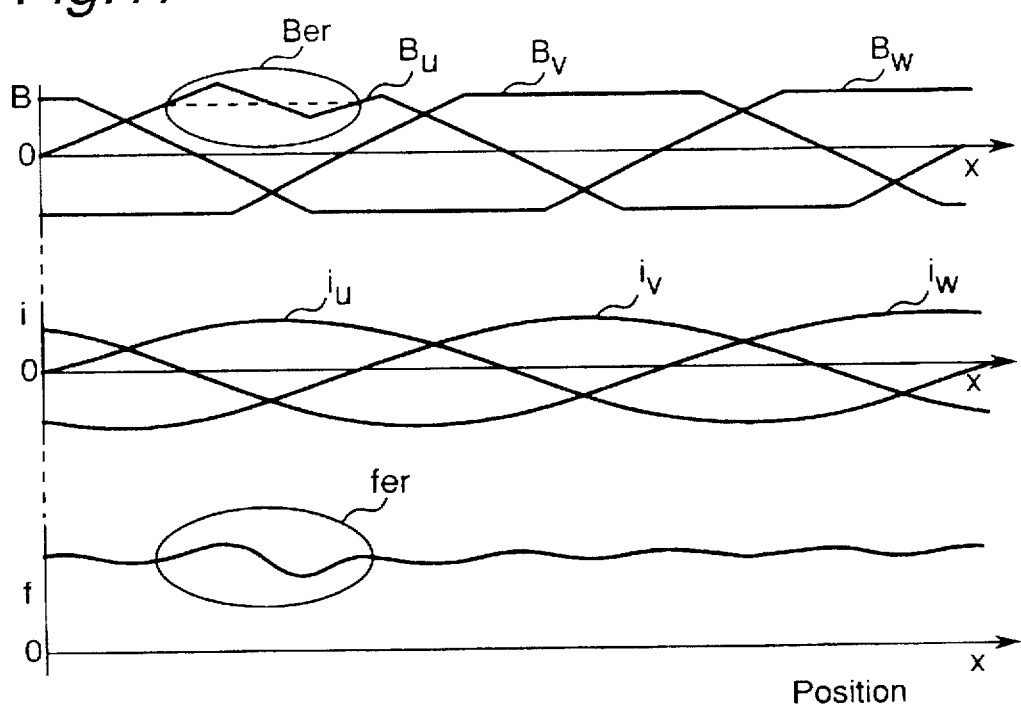
*Fig.18*
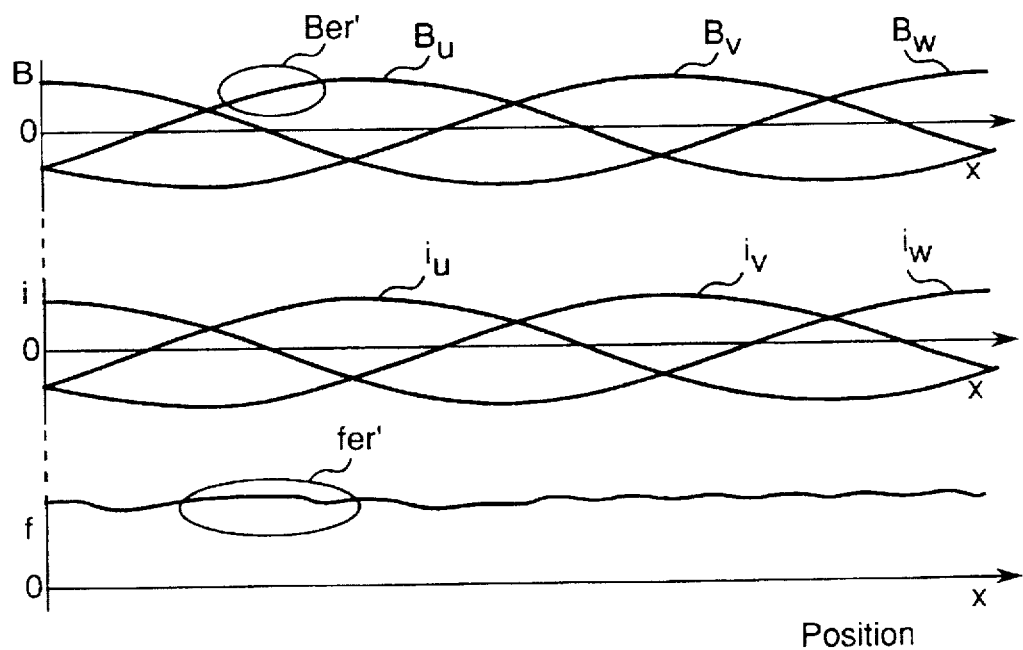

LINEAR MOTOR

BACKGROUND OF THE INVENTION

1. Field of the Invention

The present invention relates to a single sided servo apparatus, or in particular to a single sided driving apparatus using a linear motor for moving or carrying a device, a product or the like.

2. Description of the Prior Art

A single sided servo apparatus with a linear motor is used in many fields which need linear movement, for example, in apparatuses for office automation such as a copying machine, an image scanner or a printer, in apparatuses for factory automation such as an X-Y table or a carrying instrument, and in optical instruments such as a camera.

In a single sided servo apparatus, a linear motor is connected to an end of a carriage extending lengthwise. In this apparatus, a free end of the longitudinal carriage opposite to the end connected to the linear motor may be retarded due to a resistance for moving at the free end and a force exerted by the motor. Then, the position of the carriage is leaned to give various troubles. For example, in an image scanner, if the carriage is inclined from the normal position, scanning for reading an image becomes difficult or accuracy of scan is deteriorated.

As to a linear motor, it is desirable to suppress torque ripples. For example, it is proposed to arrange a pair of coils of a linear motor by shifting their positions by a distance of a half of pole pitch. It is also known that torque ripples are not generated for a linear motor if field magnets have a sinusoidal magnetization distribution and armature coils are driven sinusoidally. However, this is practically impossible. Then, field magnets having a generally trapezoid magnetic flux distribution along their longitudinal direction are used for a linear motor.

SUMMARY OF THE INVENTION

An object of the present invention is to provide a linear motor which suppresses torque ripples by using field magnets having a non-sinusoidal magnetic flux distribution along their longitudinal direction.

Another object of the present invention is to provide a single sided servo apparatus which generates a stable thrush having a small variation thereof.

A linear motor according to the invention comprises a first part including field magnets and a second part including armature coils, the first part being opposed to the second part. A first arrangement pattern of magnetic flux distribution of the field magnets has a non-zero tilt angle relative to a second arrangement pattern of the armature coils. For example, the linear motor comprises a linear array of a plurality of field magnets and armature coils. The array of the field magnets has a non-sinusoidal magnetic flux distribution such as a roughly trapezoid magnetic flux distribution along a longitudinal direction thereof. Planes including the armature coils are arranged to have a non-zero relative angle to a pattern or a phase of a magnetic flux distribution of the field magnets. In other words, the armature coils have a non-zero relative tilt angle to the pattern of magnetic flux distribution of the field magnets. In the linear motor, an armature coil is subjected in a magnetic flux distribution having different phases among portions in a plane including the armature coil. Therefore, a variation of magnetic flux distribution is smoothed (as a generally sinusoidal change) by the armature coils. Thus, when a sinusoidal current is applied to the armature coils, torque ripples are suppressed, and a stable thrust can be generated. Further, because there are no portions which do not contribute a thrust of armature coils, a multi-phase linear motor such as three phase linear motor can be constructed.

A single sided servo apparatus according to the invention comprises a carriage member having a longitudinal shape and the above-mentioned linear motor for driving the carriage member at a first end thereof along a width direction perpendicular to a longitudinal direction of the carriage member. The linear motor comprises the stator and the movable piece, and the movable piece is connected to the first end of the carriage member. The first arrangement pattern of the field magnets or the armature coils in the stator has an angle relative to the second arrangement pattern of the armature coils or the field magnets in the movable piece so that a thrust is generated to move a second end of the carriage member opposite to the first end forward than the first end thereof connected to the linear motor.

An advantage of the invention is that a linear motor can generate a stable thrust.

An advantage of the present invention is that a multi-phase linear motor has a small variation of thrust.

BRIEF DESCRIPTION OF THE DRAWINGS

These and other objects and features of the present invention will become clear from the following description taken in conjunction with the preferred embodiments thereof with reference to the accompanying drawings, and in which:

FIG. 12 is a diagram of magnetic flux distribution, drive current and thrust in a three-phase linear motor when a relative tilt angle θ is equal to $\tan^{-1}(2P/(3 \cdot R))$;

FIG. 13 is a diagram of magnetic flux distribution, drive current and thrust in a three-phase linear motor when a relative tilt angle θ is equal to $\tan^{-1}(P/R)$;

FIG. 17 is a diagram of magnetic flux distribution, drive current and thrust in a linear motor with no relative tilt angle when magnetization is disturbed;

FIG. 18 is a diagram of magnetic flux distribution, drive current and thrust in an n-phase linear motor with a relative tilt angle θ of $\tan^{-1}(P/(n \cdot R))$ when magnetization is disturbed;

DETAILED DESCRIPTION OF THE PREFERRED EMBODIMENTS

Figure 1A:
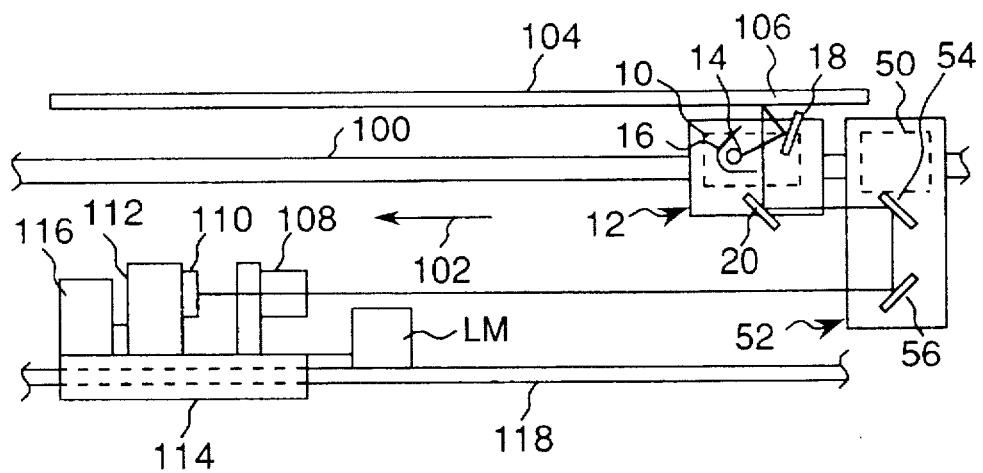
FIG. 1A is a schematic elevational view of an image scanner including two single sided servo apparatuses.
Figure 1B:
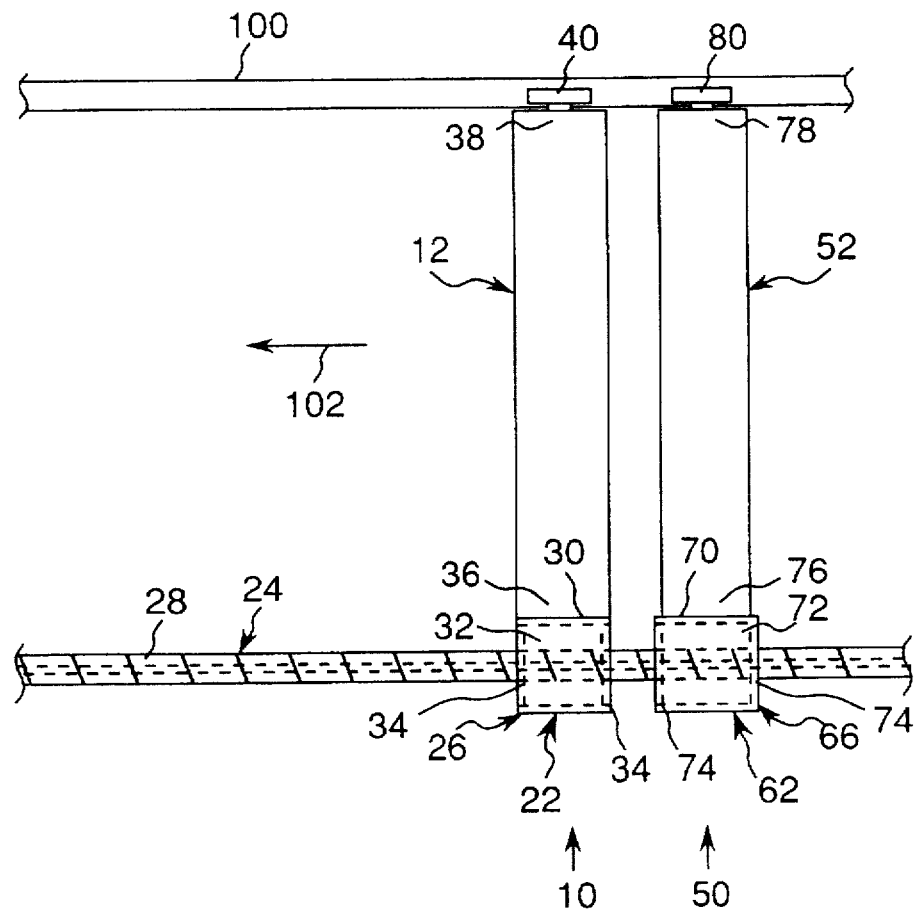
FIG. 1B is a plan view of the servo apparatus shown in FIG. 1A.

Referring now to the drawings, wherein like reference characters designate like or corresponding parts throughout the views, FIG. 1A shows an elevational view of an image scanner including two single sided servo apparatuses 10 and 50 shown as dashed lines, and FIG. 1B shows a plan view thereof where a long carriage 12 driven by the servo apparatus 10 and another long carriage 52 driven by the other servo apparatus 50. A lamp 14, mirrors 16, 18 and 20 are mounted on the carriage 12, while mirrors 54 and 56 are mounted on the other carriage 52. The carriages 12 and 52 are moved on a guide rail 100 along a subscan direction 102 of the image scanner. The carriage 12 is moved at a speed twice that of the carriage 52, so that an optical distance from a read position 104 on a document 106 put on a platen glass (not shown) to a lens 108 is kept constant to focus an image on a CCD image sensor 110. The sensor 110 is fixed to a support 112. The support 112 and a focus motor 114 for moving the support 112 are put on a stage 114. A motor 116 moves the stage 114 along a guide rail 118 provided along the subscan direction 102.

The single sided servo apparatus 10 has a linear motor 22 which drives the carriage 12. The linear motor 22 comprises a stator 24 and a cylindrical armature 26. The stator 24 has a rod-like shape having a circular cross section, and it comprises a linear array of field magnets 28 which are magnetized so that N and S field poles at the surfaces thereof are arranged alternately along the subscan direction 102. The armature 26 comprises a ferromagnetic cylindrical yoke 30 and an armature coil 32 provided along the inside of the yoke 30 to encircle the stator 24. The armature 26 has bearings 34 at two ends thereof which make it movable smoothly along the rod-like stator 24. On the other hand, the other single sided servo apparatus 50 has another linear motor 62 which drives the other carriage 52. The linear motor 62 comprises the stator 24 and a cylindrical armature 66. The armature 66 has an armature coil 70 which encircles the stator 24. That is, the two linear motors 22 and 62 have the common stator 24. The armature 66 comprises a ferromagnetic cylindrical yoke 70 and an armature coil 72 provided along the inside of the yoke 70 to encircle the stator 24. The armature 66 also has bearings 74 at two ends thereof which make it movable smoothly along the rod-like stator 24.

As shown in FIG. 1B, one end 36 of the carriage 12 is fixed to a side of the armature 26 with a connecting means (not shown), while an opposite free end 38 thereof has a roller 40 which is put in the guide rail 100 provided to be parallel to the stator 24. Similarly, one end 76 of the carriage 52 is fixed to a side of the armature 66 with a connecting means (not shown), while an opposite free end 78 thereof has a roller 80 which is put in the guide rail 100. As will be explained later, a thrust is generated by supplying currents to the armature coils 32, 72 so as to move the armatures 26, 66 along the stator 24 so as to drive the carriages 12, 52 at the single side. Thus, the optical components such as the lamp 14 and the mirror 54 are moved along the subscan direction 102 to read an image of the document 91. The carriages 12, 52 return to start positions by moving the armatures 26, 66 along the reverse direction.

Figure 2A:
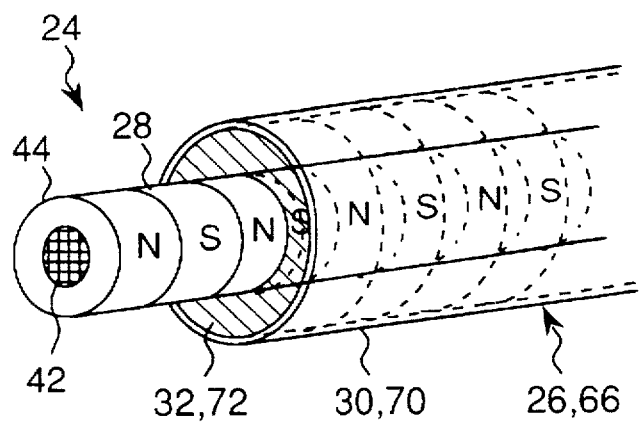
FIG. 2A is a perspective view for illustrating a structure of a stator and an armature.
Figure 2B:
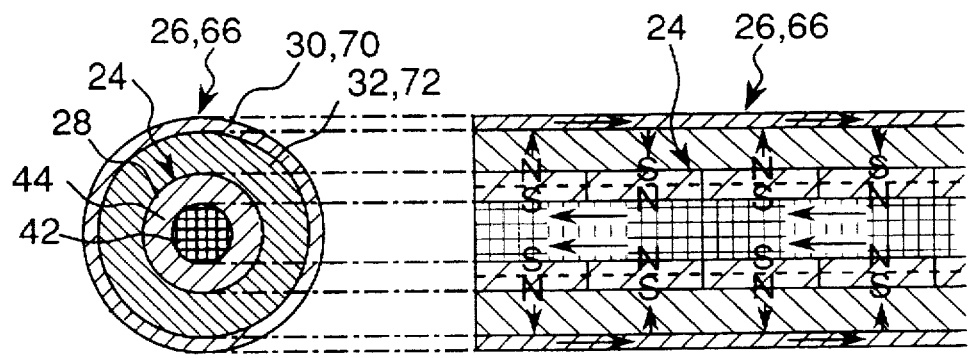
FIG. 2B is a diagram for illustrating a magnetic loop in the structure shown in FIG. 2B.

FIG. 2A shows the stator 24 and the armature 26 of a linear motor, and FIG. 2B shows a section of the linear motor and a magnetic loop therein. A ferromagnetic rod of a yoke 42 is inserted through its hole at the center by a rod member 44 which can be magnetized. The yoke 42 has a circular section with a smooth surface. Then, the yoke 42 is magnetized to form field magnets 28 so that N and S field poles thereof are arranged alternately along the subscan direction. The field magnets 28 are magnetized to have a trapezoid-like flux density distribution with a period of a pair of N and S poles. Arrows in FIG. 2B show directions of magnetic flux. Though the stator 24 is not restricted to the type described above, its smooth surface reduces a moving resistance of the armature, and the inserted ferromagnetic yoke 42 increases the magnetization or the thrust. If the stator were made of ring-like field magnets inserted on the rod so that N and S poles are arranged alternately, the surface of the stator becomes uneven, and it is also difficult to smooth the surface after the construction of the stator, or it is difficult to have a stator with a high precision. In this embodiment, because the magnetization operation is performed after the ferromagnetic yoke is inserted on the center rod, the surface of the stator is smooth.

As shown in FIG. 2A, the armature coil 32, 72 is provided inside the cylindrical yoke 30, 70 on the field magnets 28. Though the armature coils 32, 72 are not limited to the structure shown in FIG. 2A, when the armature coils 32, 72 is combined with the stator 24 as shown in FIG. 2A, a magnetic loop is formed along the yoke 42, the field magnet 28, the armature coil 32, 72 and the yoke 30, 70, as shown with arrows in FIG. 2B, and this encloses magnetic flux efficiently. Thus, the magnetic flux density between the yokes 42 and 30, 70 becomes high and the thrust is enhanced. If there is no ferromagnetic core inside the stator 24, the magnetic flux inside a cavity at the center is dispersed and the magnetic flux density becomes lower.

Figure 3A:
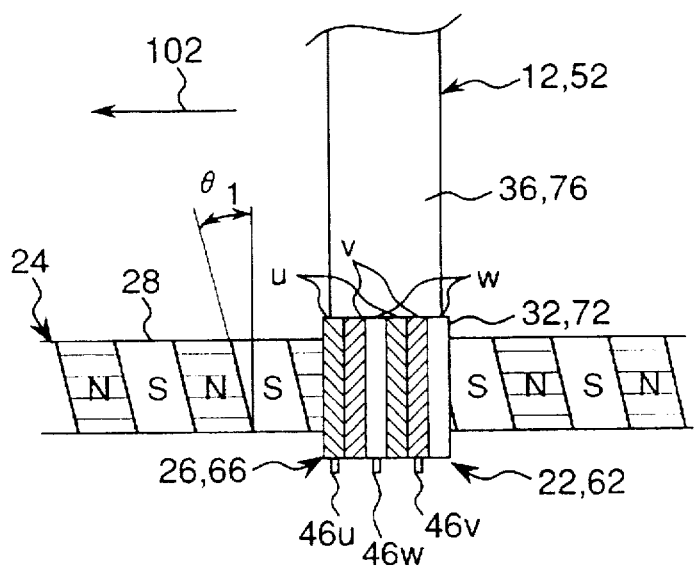
FIG. 3A is a diagram for illustrating patterns of arrangement of field magnets and armature coils in the linear motor.
Figure 3B:
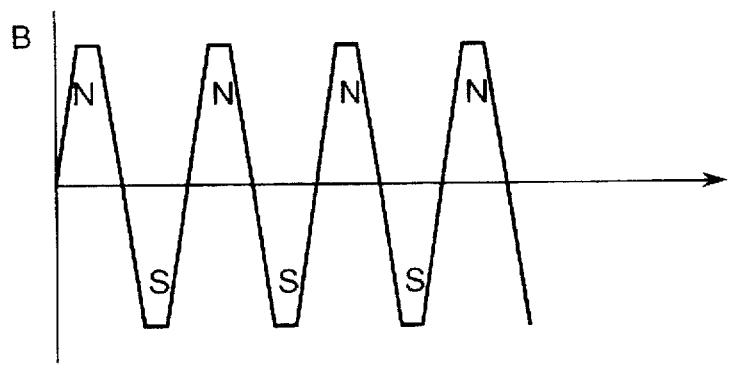
FIG. 3B is a graph of magnetic flux distribution.

Next, it is explained on the linear motors 22 and 62 with reference to FIGS. 3A and 3B how a pattern of arrangement of field poles of the field magnets 28 in the stator 24 is related to a pattern of arrangement of the armature coils 32, 72 in the armature 26, 66. In the pattern of arrangement of the armature coils 32, 72 shown in FIG. 3A, a plane including the armature coil 32, 72 and its vacant hole is perpendicular as usual to the width direction of the carriages 12, 52 or to the moving direction of the armature 26, 66. However, the pattern of arrangement of N and S field poles of the field magnets 28 is tilted by a tilt angle $\theta_1$ with respect to a perpendicular direction to the longitudinal direction of the stator 28. In other words, a boundary plane at which a polarity of the field magnets changes is inclined or has a slope relatively to the planes including the armature coils 32, 72, or a plane including a boundary between adjacent N and S poles is tilted with respect to the plane including armature coils 32, 72. The relative non-zero tilted angle $\theta_1$ between the two patterns is decided so that a side of a field magnet 28 from which the carriage 12, 52 extends precedes the other side thereof along the subscan direction 102, or so that the free end 38, 78 of the carriage 12, 52 precedes the fixed end 36, 76.

Preferably, the angle $\theta_1$ satisfies a condition $$\theta_1 \geq \tan^{-1}(C/L), \quad (1)$$

where C denotes a clearance (60 μm in this example) between the stator 24 and the bearing 34, 74 and L denotes a length of the armature along the moving direction or a distance (60 mm) between the pair of the bearings 34, 74 because they are arranged at two sides of the armature in this example. Preferably, the angle $\theta_1$ also satisfies another condition $$\theta_1 = \tan^{-1}(P/R), \quad (2)$$

where R denotes an outer diameter of the stator 28 and P denotes a pole pitch of the stator 28 or OR period of a pair of S and N field poles along the moving direction of the armature.

By adopting the above-mentioned patterns of the arrangement of the field poles and of the armature coils, a thrust is generated to move the free end of the carriage 12, 52 forward than the fixed end thereof when a current is supplied to the armature coils. The thrust tends to rotate the armature 26, 66, and the rotation force makes the free end 38, 78 of the carriage 12, 52 move along the subscan direction 102 against a force to resist the movement or to incline the carriage. Further, because the condition $\theta_1 \geq \tan^{-1}(C/L)$ is satisfied, the rotation force makes the free end 38, 78 of the carriage to recover the delay thereof more surely. Then, the free end 38, 78 of the carriage 12, 52 moves without delay relatively to the other end 36, 76 connected to the linear motor 22, 62. Thus, a document image can be read precisely. Further, because the other condition $\theta_1 = \tan^{-1}(P/R)$ is also satisfied, generation of torque ripples (so-called cogging) can be suppressed even if magnetization pattern is departed from a sinusoidal wave.

The linear motors 22 and 62 are controlled as will be explained below. As shown in FIG. 3A, the armature coil 32, 72 of the armature 26, 66 comprises coils u, v and w for three phases arranged at positions shifted by (⅔) π of electric angle each other. In this example, six coils of the three phases are provided. Further, position detectors 46u, 46v and 46w are set at central positions of the coils u, w and v. The position detectors are Hall elements which detects the magnitude and direction of magnetic field. FIG. 3B shows that magnetic flux distribution along the center line of the field magnets 28. That is, the field magnets 2B have a trapezoid magnetization distribution generally.

Figure 4:
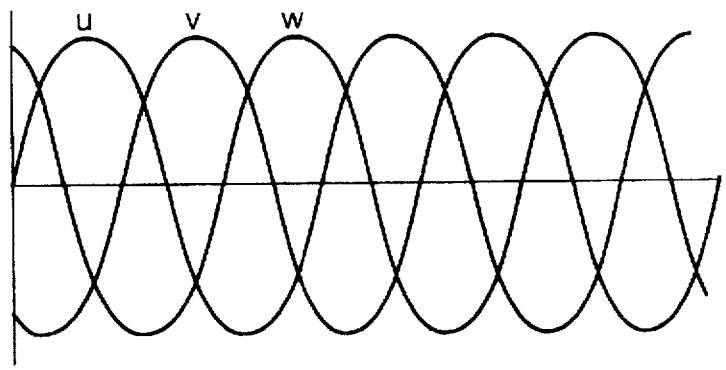
FIG. 4 is a diagram of three-phase waveforms of input signals in three-phase driving scheme.

The linear motors 22 and 26 are driven with three-phase currents determined according to the magnetic field detected by the sensors 46u, 46v and 46w. That is, as shown in FIG. 4, signals having a phase shifted by 120° each other are supplied to the coils u, v and w of the armature coils 32, 72 so as to generate a constant thrust irrespectively of the position of the armature 26, 66. A phase synchronization control called as phase locked loop is used in a servo system to drive the armature 26, 66 at a desired speed.

Figure 5:
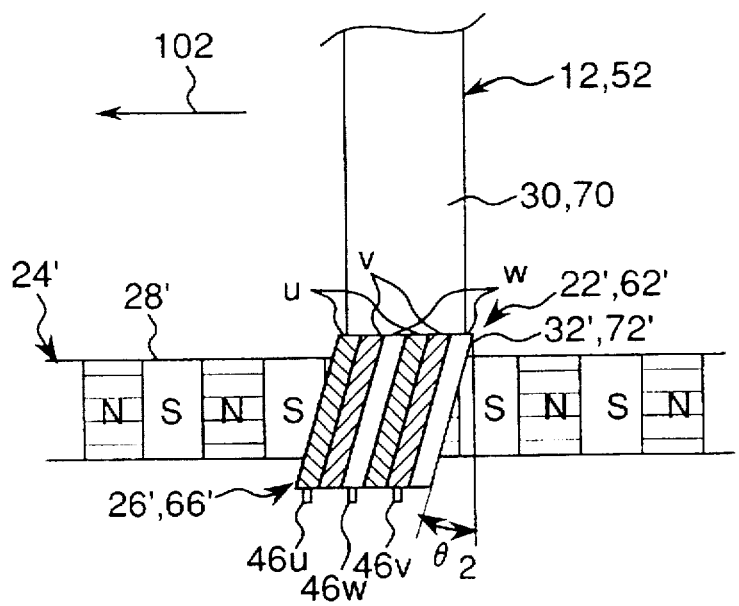
FIG. 5 is a diagram of a different example of a pattern of arrangement of field magnets and armature coils in the linear motor.

FIG. 5 shows a different example in contrast to a pattern shown in FIG. 3A where the pattern of arrangement field poles is tilted. In FIG. 5, the pattern of arrangement of armature coils 32', 72' of an armature 26', 66' is tilted by an angle $\theta_2$ relatively to the longitudinal direction of the carriages 12, 52, or perpendicularly to the moving direction of the armature 26', 66'. On the other hand, the pattern of arrangement of N and S field poles of field magnets 28' of a stator 24' is not tilted with respect to a direction perpendicular to the longitudinal direction of the stator 24' as usual. In other words, the plane of the armature coils 32', 72' including the vacant core thereof is tilted by an angle $\theta_2$ or retarded at a side of the linear motor from which the carriage 12, 52 extends with respect to the other side thereof. The above-mentioned conditions, $\theta_2 \geq \tan^{-1}(C/L)$ and $\theta_2 = \tan^{-1}(P/R)$ are also satisfied. Similar advantages to those of the patterns shown in FIG. 3A can be realized.

Figure 6:
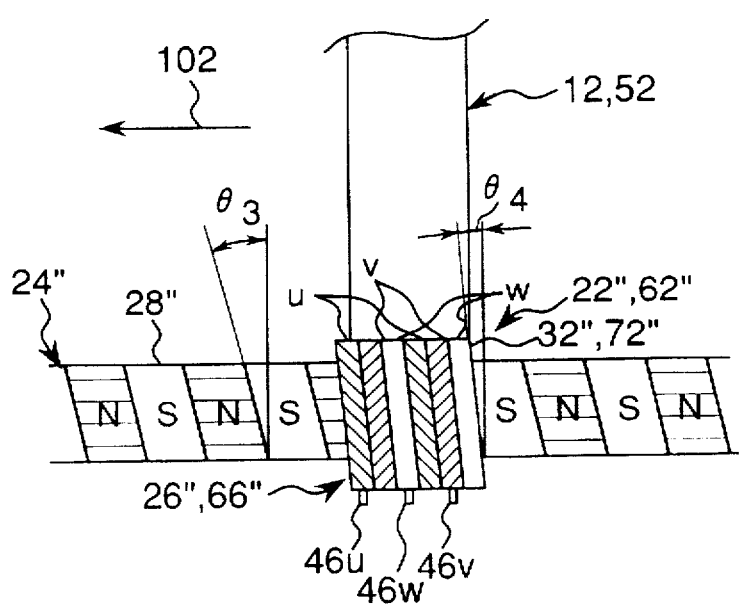
FIG. 6 is a diagram of a further example of a pattern of arrangement of field magnets and armature coils in the linear motor.

FIG. 6 shows a further different example where the pattern of the arrangement of N and S field poles of field magnets 28" of a stator 24" is tilted by an angle $\theta_3$ relatively to a direction perpendicular to the moving direction of an armature 26", 66" and that of planes of armature coils 32", 72" including the vacant cores thereof is tilted simultaneously by an angle $\theta_4$ relatively to the direction perpendicular to the moving direction of an armature 26", 66". Thus, the pattern of the arrangement of N and S field poles of field magnets 28" is tilted by a relative angle of $\theta_5 = \theta_4 - \theta_3$ with respect to that of planes of armature coils 32", 72". The above-mentioned conditions, $\theta_5 \geq \tan^{-1}(C/L)$ and $\theta_5 = \tan^{-1}(P/R)$ are also satisfied. Similar advantages to those of the patterns shown in FIG. 3A can be realized.

Figure 7:
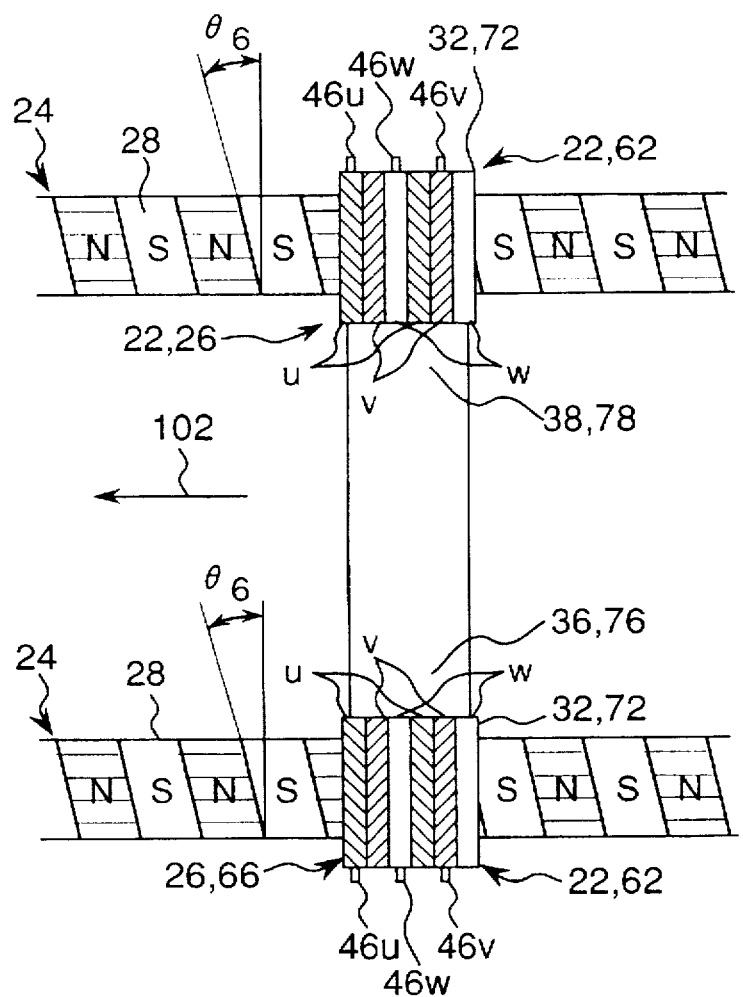
FIG. 7 is a diagram of a still further example of a pattern of arrangement of field magnets and armature coils in the linear motor.

FIG. 7 shows an example where the two same linear motors 22, 62 are connected to the two ends of the long carriage 12, 52. The tilt angle $\theta_6$ of the pattern of the arrangement of field poles 28 satisfies the above-mentioned conditions, $\theta_6 \geq \tan^{-1}(C/L)$ and $\theta_6 = \tan^{-1}(P/R)$. In this example, when the carriages 12 and 52 are moved along the subscan direction 102, only the linear motors 22 and 62 provided at the lower side in FIG. 7 are operated, while when they are moved along the reverse direction, the other linear motors provided at the upper side in FIG. 7 are operated. Thus, the carriages 12 and 52 are driven both along the subscan and return directions. If the position of the carriages 12 and 52 is not a problem, the linear motors at the two sides may be used at the same time for faster movement.

Though the above-mentioned linear motors are three-phase linear motors, a two-phase linear motor is constructed similarly wherein armature coils comprises coils in correspondence to the two phases instead of the above-mentioned coils u, v and w for three phases. The position detectors are also set near the coils.

As described in the above-mentioned embodiments, a feature of the linear motor of the invention is that the field magnets 28 and the armature coils 32, 72 are arranged to have the relative non-zero tilt angle $\theta_1$, $\theta_2$ or $\theta_5$. By providing such tilt angle, a magnetic field exerting the armature coil 32, 72 has different phases at positions in the coil, and the magnetic flux distribution is dispersed in a smooth or generally sinusoidal way. This smooth magnetic flux distribution and the sinusoidal current supplied to the armature coils 32, 72 can suppress torque ripples and can generate a stable thrust. Further, in these structures of the linear motor, there is no position of field magnets which does not contribute to the thrust. Then, a two-phase linear motor and a three-phase linear motor can be constructed by setting the non-zero relative tilt angle.

Figure 8:
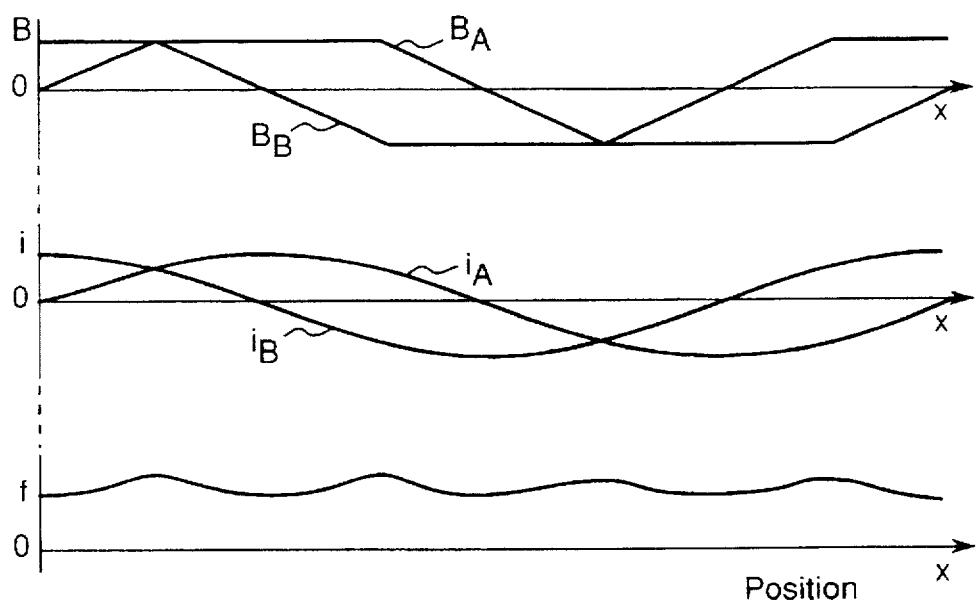
FIG. 8 is a diagram of magnetic flux distribution, drive current and thrust in a two-phase linear motor when no relative tilt angle is provided.
Figure 9:
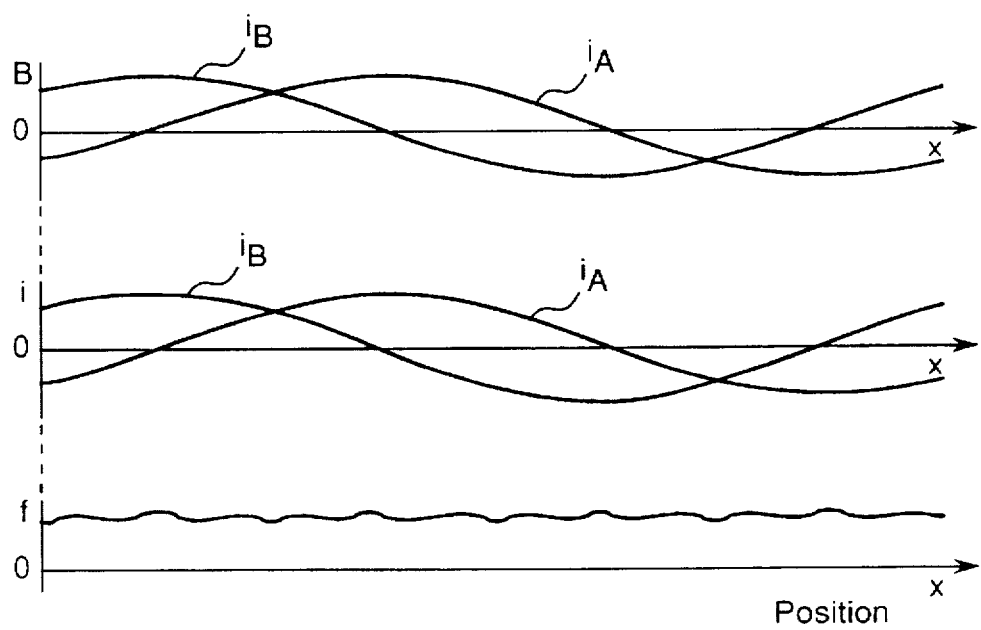
FIG. 9 is a diagram of magnetic flux distribution, drive current and thrust in a two-phase linear motor when a relative tilt angle θ is equal to $\tan^{-1}(P/(3 \cdot R))$.
Figure 10:
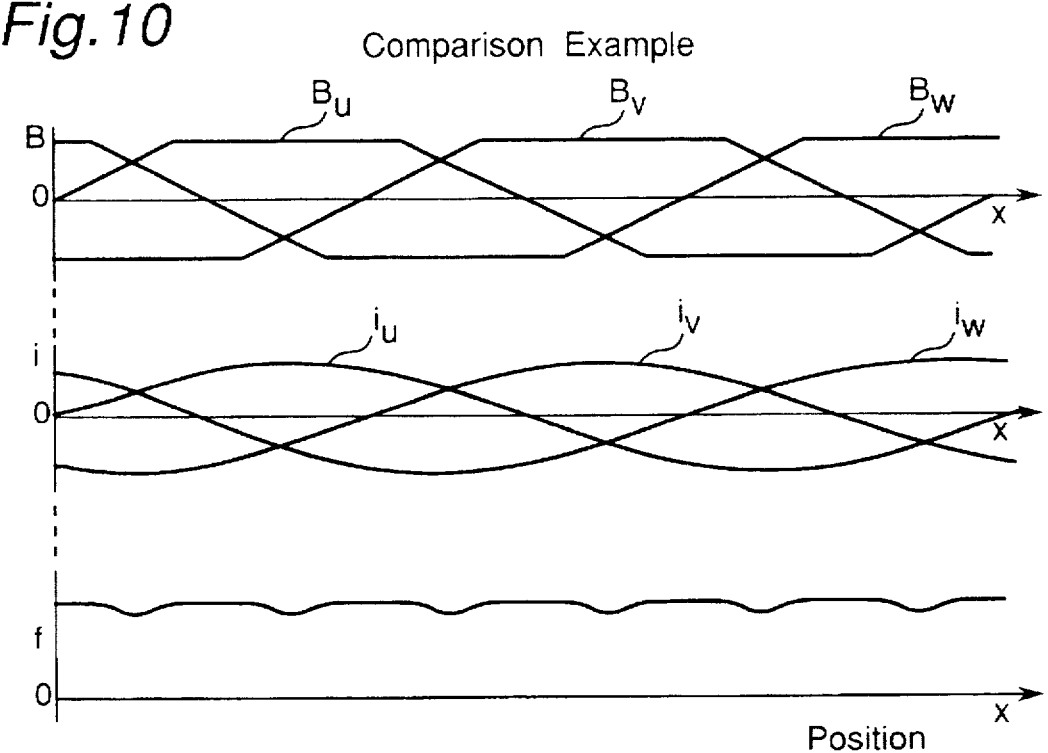
FIG. 10 is a diagram of magnetic flux distribution, drive current and thrust in a three-phase linear motor when no relative tilt angle is provided.
Figure 11:
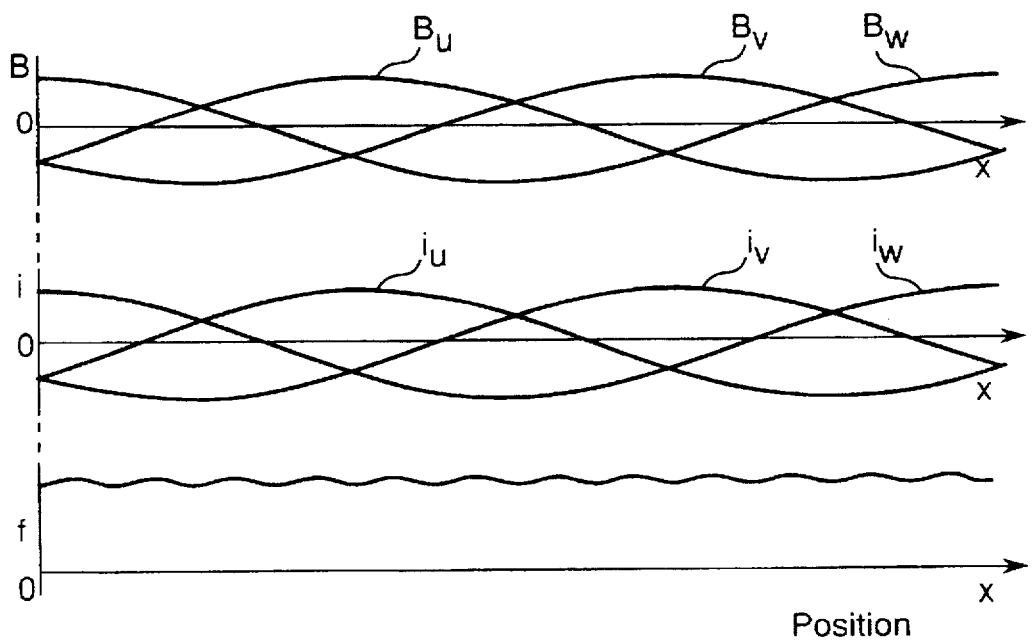
FIG. 11 is a diagram of magnetic flux distribution, drive current and thrust in a three-phase linear motor when a relative tilt angle θ is equal to $\tan^{-1}(P/(3 \cdot R))$.

This advantage of the relative tilt angle is explained in detail. FIGS. 8 and 9 show results for a two-phase linear motor of calculation of magnetic fluxes (B) exerting two armature coils (phases A and E;), currents of the two phases (i) and a rate $\Delta f$ of variation of the thrust f. $(f_{max}-f_{min})/(f_{ave}/2)$, generated by the magnetic flux and the current where $f_{max}$ denotes a maximum of the thrust f, $f_{min}$ denotes a minimum of the thrust and $f_{ave}$ denotes an average of the thrust f. The abscissa denotes a position x along the longitudinal direction of the stator 24 along which the field magnets 28 are arranged.

FIG. 8 shows a comparison case when no relative tilt angle is provided or the relative tilt angle is 0°. It is shown that the magnetic flux of each phase exerting armature coils has a trapezoid-like distribution in correspondence to the trapezoid-like distribution of the magnetic flux of the stator 24 shown in FIG. 3B. The average thrust $f_{ave}$ is normalized 1.00, and the rate of variation of thrust $\Delta f=(f_{max}-f_{min})/(f_{ave}/2)$ is 0.048.

FIG. 9 shows a case when a relative tilt angle $\theta$ is equal to $\tan^{-1}(P/2 \cdot R)$ where R denotes an outer diameter of the stator 28 and P denotes a pole pitch of the stator 28 or a period of magnetization along the moving direction of the armature. In this case, the distribution of the magnetic flux B becomes smooth like a sinusoidal wave because magnetic flux varies in the armature coil due to the tilted angle. Then, though the average thrust $f_{ave}$ is decreased by 15% if compared with the case of zero relative tilt angle shown in FIG. 8, the rate of variation of thrust $\Delta f=(f_{max}-f_{min})/(f_{ave}/2)$ is suppressed to 1.1%.

Similarly, FIGS. 10, 11, 12 and 13 show results for a three-phase linear motor of calculation of magnetic fluxes (B) exerting armature coils (phases A and B), currents of the three phases (i) and a rate $\Delta f$ of variation of the thrust f. $(f_{max}-f_{min})/(f_{ave}/2)$, generated by the magnetic flux and the current. In these cases, the magnetization pattern is assumed to be a trapezoid pattern along the longitudinal direction. It is known that if the magnetization pattern is sinusoidal perfectly, no torque ripples are generated. However, a perfect sinusoidal pattern cannot be realized practically. Further, in order to get a large thrust, non-sinusoidal magnetization pattern such as a square pattern or a generally trapezoid pattern is used actually. FIGS. 10, 11, 12 and 13 correspond to cases of relative tilt angles of zero, $\tan^{-1}(P/(3 \cdot R))$, $\tan^{-1}(2 \cdot P/(3 \cdot R))$ and $\tan^{-1}(P/R)$, respectively. In the comparison case of zero tilt angel shown in FIG. 10, the magnetic flux of each phase exerting armature coils has a trapezoid-like distribution in correspondence to the trapezoid-like distribution of the magnetic flux of the stator 24 shown in FIG. 3B, similarly to in FIG. 8. The average thrust $f_{ave}$ is normalized to be 1.00, and the rate $\Delta f=(f_{max}-f_{min})/(f_{ave}/2)$ of variation of the thrust f is 0.017. In the other cases shown in FIGS. 11–13, the distribution of the magnetic flux B becomes smooth like a sinusoidal wave because magnetic flux varies at positions in the armature coil due to the tilted angle, and though the average thrust $f_{ave}$ is decreased if compared with the case of zero relative tilt angle, the rate of variation of thrust $\Delta f=(f_{max}-f_{min})/(f_{ave}/2)$ is suppressed. In the second case of relative tilt angel of $\tan^{-1}(P/(3 \cdot R))$ shown in FIG. 11, though the average thrust $f_{ave}$ is decreased by 7%, the rate $\Delta f=(f_{max}-f_{min})/(f_{ave}/2)$ is suppressed to 0.003. In the third case of relative tilt angel of $\tan^{-1}(2 \cdot P/(3 \cdot R))$ shown in FIG. 12, though the average thrust $f_{ave}$ is decreased by 26%, the rate $\Delta f=(f_{max}-f_{min})/(f_{ave}/2)$ is suppressed to 0.004. In the fourth case of relative tilt angel of $\tan^{-1}(P/R)$ shown in FIG. 13, though the average thrust $f_{ave}$ is decreased by 50%, the rate $\Delta f=(f_{max}-f_{min})/(f_{ave}/2)$ is suppressed to 0.007.

Figure 14:
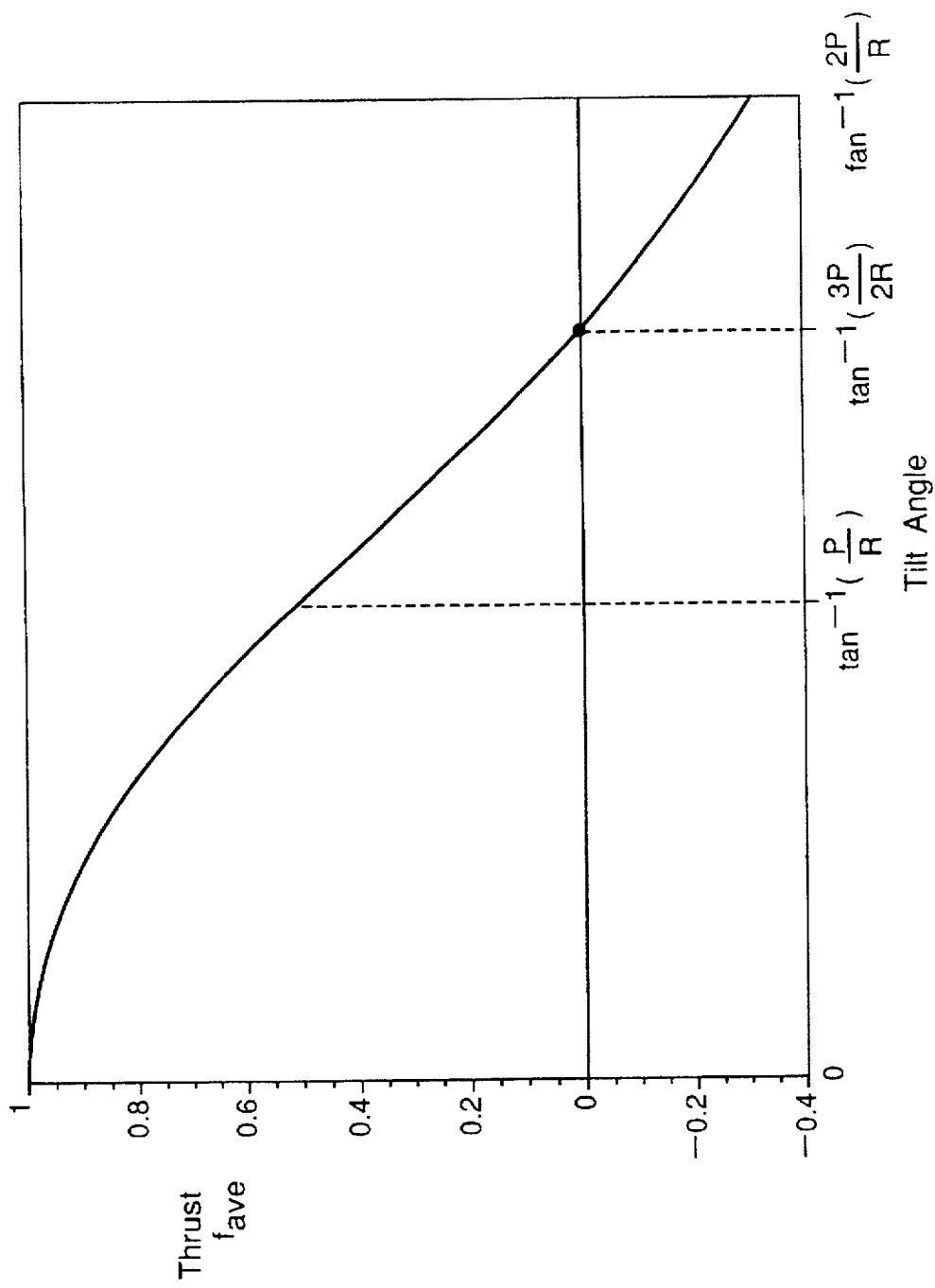
FIG. 14 is a graph of variation of thrust plotted against relative tilt angle.

FIG. 14 shows a graph of the rate $\Delta f$ of variation of thrust plotted against relative tilt angle $\theta$. The normalized thrust f decreases with increase in relative tilt angle $\theta$, and crosses zero at $\tan^{-1}(2 \cdot P/(3 \cdot R))$.

Figure 15:
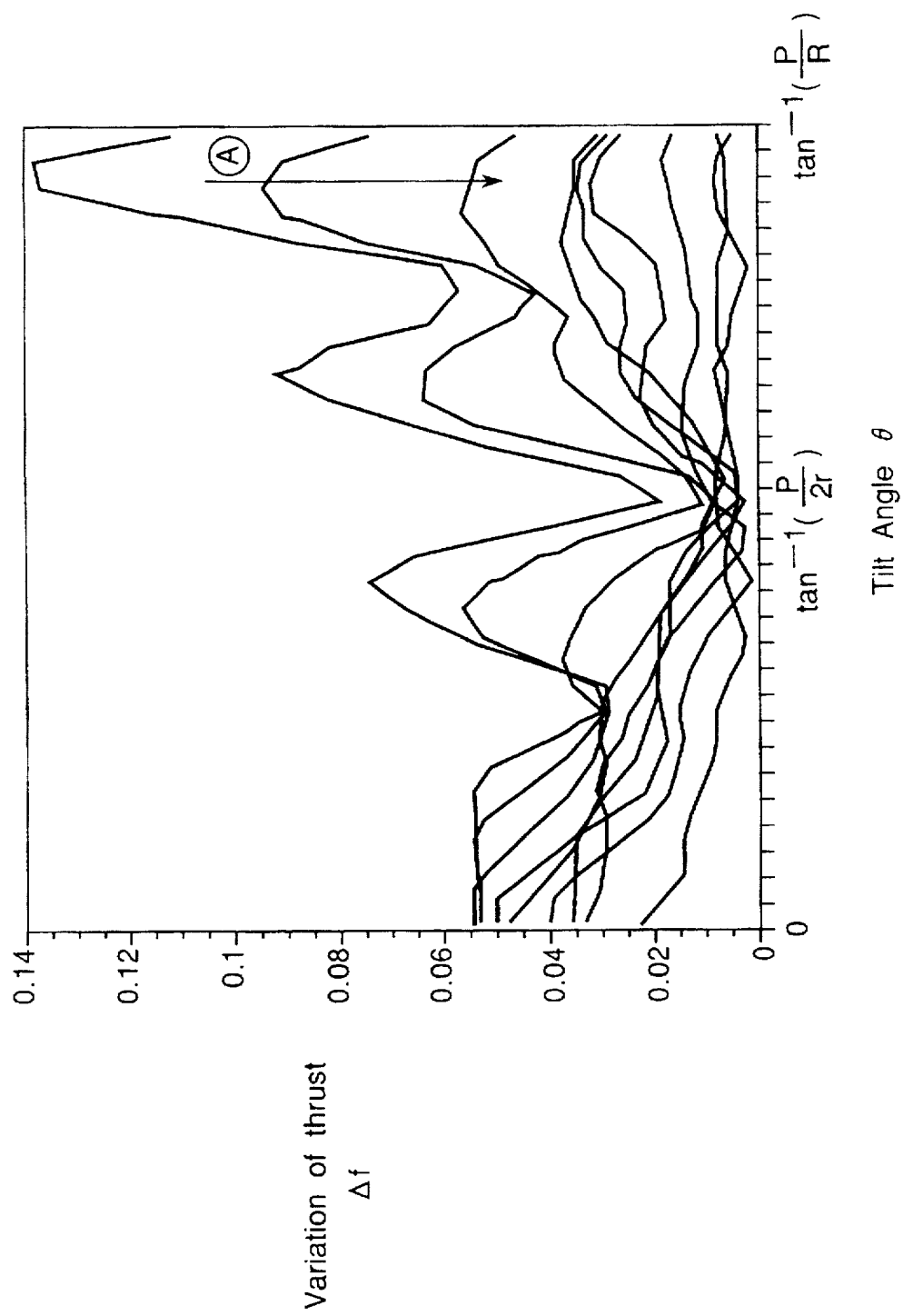
FIG. 15 is a graph of variation of thrust of a two-phase motor when the upper and bottom flat regions of the trapezoid magnetic flux distribution are changed.
Figure 16:
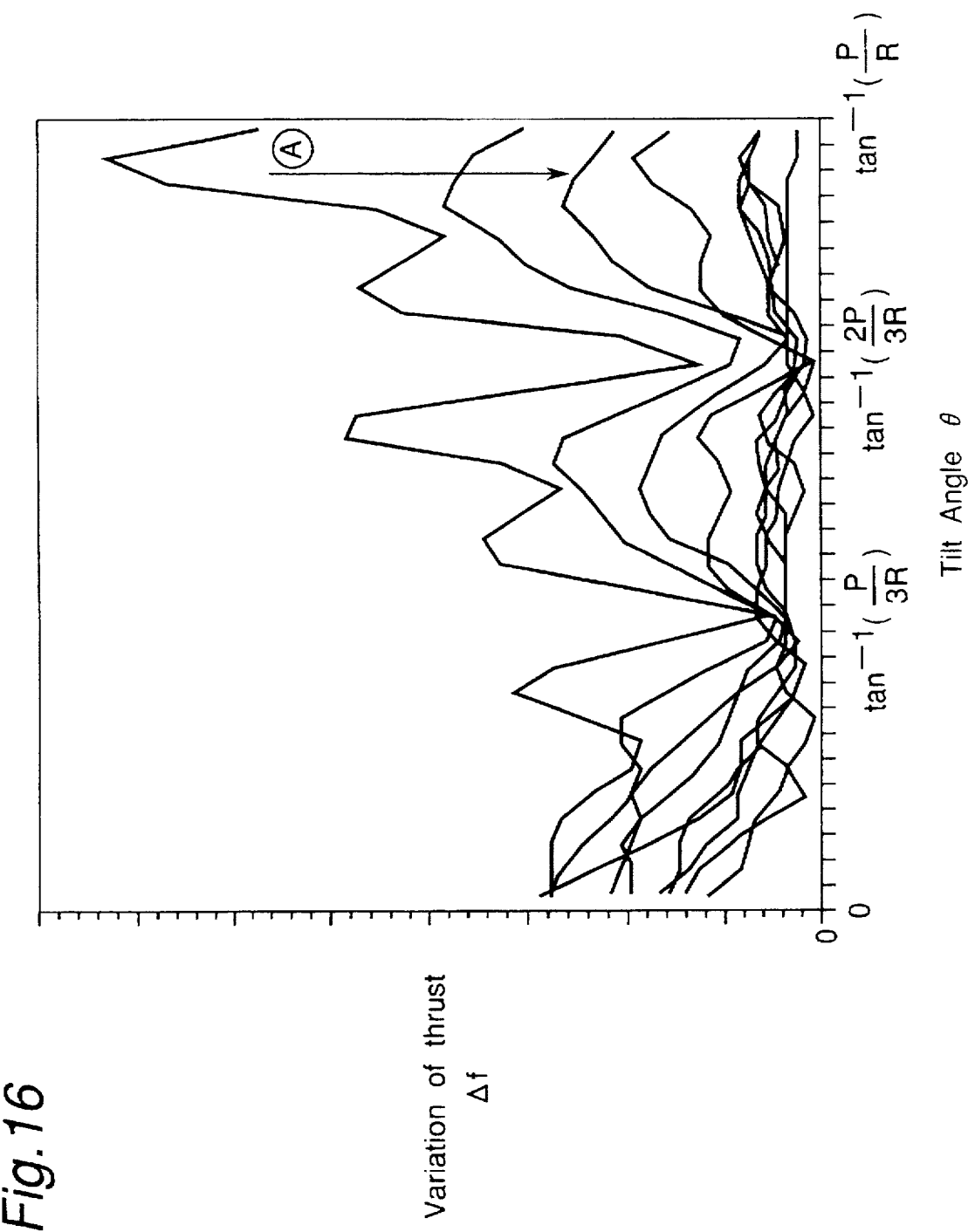
FIG. 16 is a graph of variation of thrust of a three-phase motor when the upper and bottom flat regions of the trapezoid magnetic flux distribution are changed.

FIGS. 15 and 16 show the rate of variation of thrust $\Delta f=(f_{max}-f_{min})/(f_{ave}/2)$ for a two-phase linear motor and for a three-phase linear motor, respectively, when a ratio of the length of the top flat region to that of the bottom flat regions of the trapezoid magnetic flux distribution is changed. The top curves in FIGS. 15 and 16 correspond to a case where the ratio is near one or a case of a generally square wave having a long upper flat region. An arrow "A" shown in FIGS. 15 and 16 shows a direction of decrease in the ratio among curves, and the curve becomes a triangular wave finally. For a two-phase linear motor, the rate of variation of thrust $\Delta f$ has a minimum around a tilt angle of $\tan^{-1}(P/(2 \cdot R))$, while for a three-phase linear motor, it has a minimum around a tilt angle of $\tan^{-1}(P/(3 \cdot R))$. There is a tendency that as the ratio decreases, the variation of the thrust decreases, while the absolute value of the thrust decreases because the total amount of magnetic flux decreases. It is preferable for a linear motor that the thrust f is large and the variation of the thrust $\Delta f$ is suppressed. Then, it is desirable for an n-phase motor that the magnetization has a trapezoid-like pattern close to a square wave and the relative tilt angle between the field magnets and the armature coils is about $\tan^{-1}(P/(n \cdot R))$.

Figure 19:
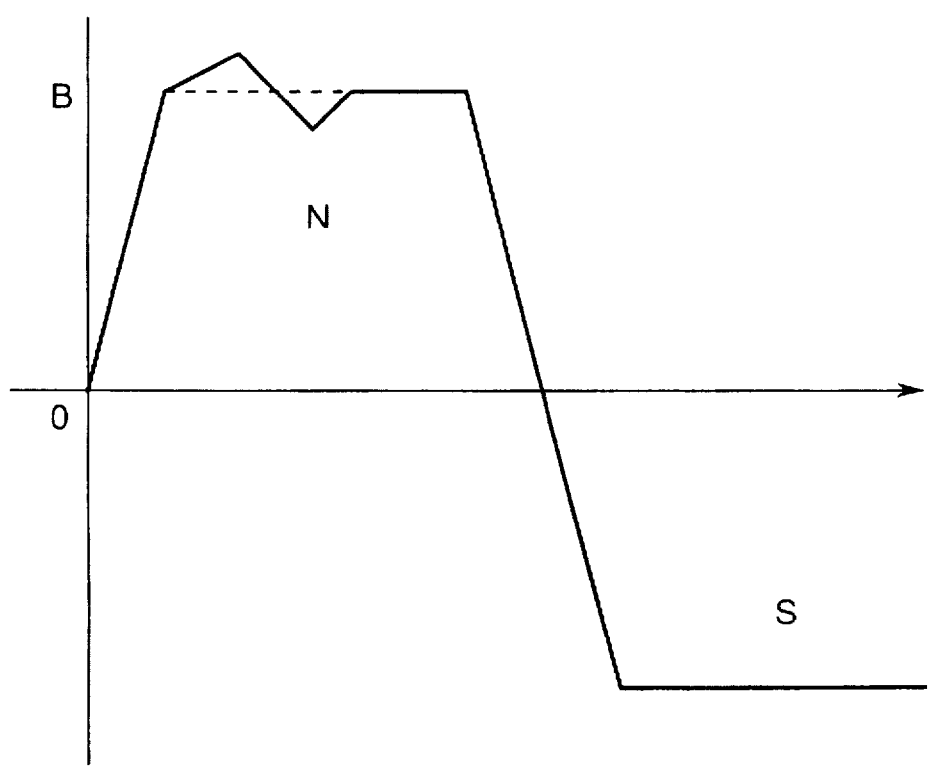
FIG. 19 is a diagram of irregular magnetization pattern.

Finally, it is explained that an effect of disturbance in magnetization can be suppressed by the relative tilt angle. FIGS. 17 and 18 show diagrams of magnetic flux distribution, drive current and thrust in an n-phase linear motor with no relative tilt angle and with a relative tilt angle $\theta$ of $\tan^{-1}(P/(n \cdot R))$, respectively, when magnetization is disturbed. It is assumed that a part of magnetization pattern exerting the armature coils is departed from the trapezoid shape (dashed line) as shown in FIG. 19. In the case of zero tilt angel shown in FIG. 17, the disturbance of magnetic flux corresponds to a portion denoted with "Ber", and the thrust is affected in a portion denoted with "fer" to result in a variation of thrust $\Delta f$ of 16%. On the other hand, in the case of tilt angel $\theta$ of $\tan^{-1}(P/(n \cdot R))$ shown in FIG. 18, the disturbance of magnetic flux, corresponds to a portion denoted with "Ber", or the disturbance is smoothed, and the thrust is affected in a portion denoted with "fer" to result in a small variation of thrust $\Delta f$ of 3.5%. Therefore, even if a part of the magnetization is departed from a normal pattern, the disturbance is distributed or smoothed by the relative tilt angle so as to suppress the variation of thrust.

As described above, because a linear motor of the invention has a relative tilt angle between the magnetization pattern of the field magnets and the position of the armature coil, the magnetic field to be applied to the armature coil has phases different at portions in the armature coil, and variation of the magnetic flux is smoothed. Then, the smoothed magnetic flux and a sinusoidal current supplied to the armature coils generate a stable thrust with no torque ripples. Further, because there is no portions which do not contribute to the thrust, a two-phase linear motor and a three-phase linear motor can be constructed.

Figure 20:
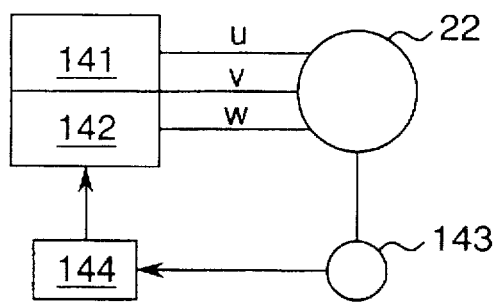
FIG. 20 is a block diagram of a control circuit of a linear motor.
Figure 21:
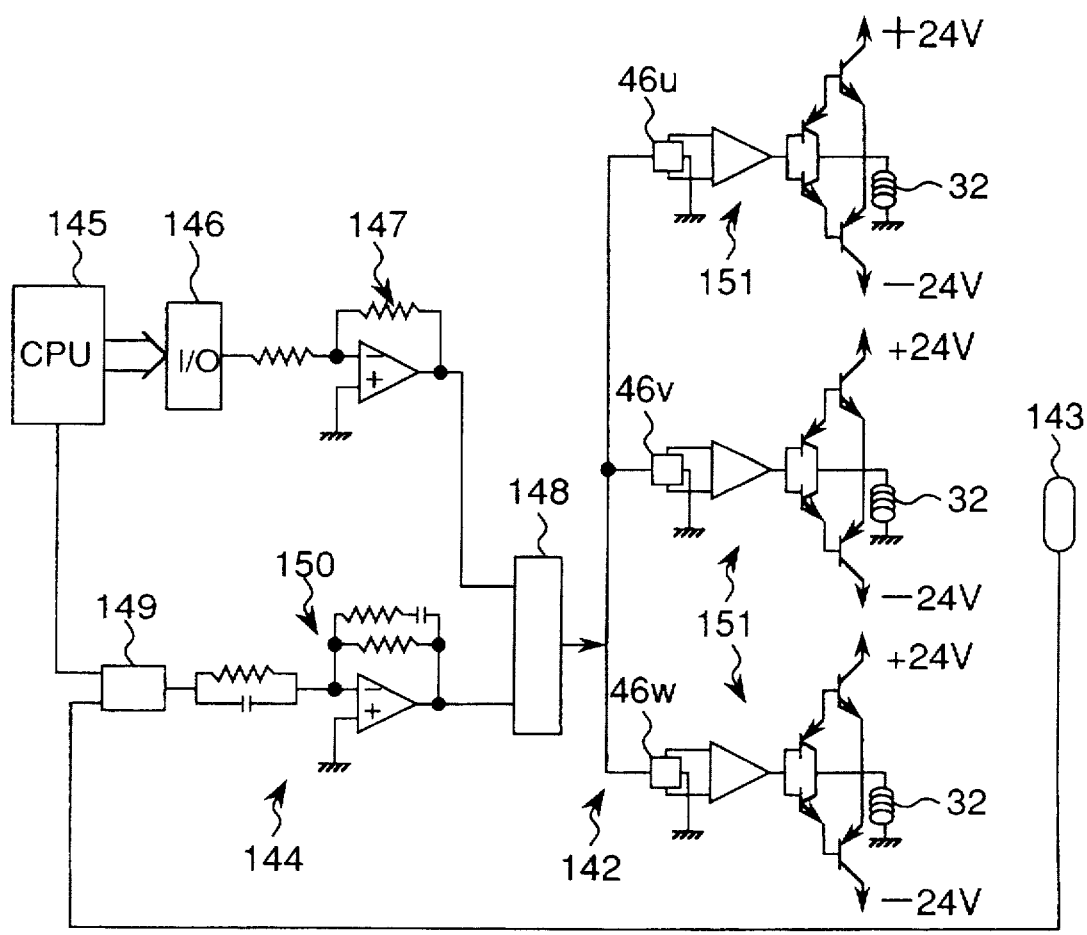
FIG. 21 is a circuit diagram of the control circuit including a speed controller of phase synchronization scheme.

Next, servo control of the linear motor is explained. FIG. 20 shows a block diagram of a servo control circuit for a linear motor, and FIG. 21 shows the servo control circuit including a speed controller 144 of phase synchronization scheme. In FIG. 20, reference numeral 141 denotes a direct current power supply, and reference numeral 142 denotes a power controller including the Hall elements which supplies three-phase currents to the linear motor 22. A microprocessor 145 sends signals through an input/output port 146, an amplifier 147 and the switch 148 to the linear motor. An encoder 143 detects a moving speeds of the armature 26. The encoder 143 comprises, for example, a magnetic encoder including magneto-resistance elements called as MR elements which move with the armature 26 along the field poles in the stator 24. The moving speed detected by the encoder 143 is feed-backed to a phase synchronous controller 149 in the speed controller 144, while the microprocessor 145 also supplies reference clock signals to the phase synchronization controller 149 in correspondence to a desired moving speed. Then, the controller 149 generates a signal in correspondence to a difference between the feed-back signals from the encoder 143 and the reference clock pulses from the microprocessor 145, and a compensation circuit 150 compensates the difference to output a reference input voltage through a switch 148 to the Hall elements 46u, 46v, 46w. The Hall elements 46u, 46v and 46w output a voltage in correspondence to an amplitude and a direction of a magnetic flux at a position, and the amplitude is proportional to a reference input signal. Then, the signals output by the Hall elements 46u, 46v and 46w are amplified by amplifiers 151 and supplied to the armature coils 32. Thus, the reference clock signals are synchronized on phase with the frequency of the feed-back signals, and the linear motor 22 is driven at a desired speed. As to the other linear motor 62, a similar servo control circuit is provided for moving the carriage at a speed half that of the linear motor 22, but it is not explained for avoiding duplicated explanation.

The linear motors explained above comprise a rod-like stator having a circular cross section and an armature encircling the stator. However, a linear motor may comprise a belt-like stator and an armature arranged opposite to the stator to move along the stator. Further, though the linear motors explained above have field magnets in the stator and an armature coil is provided in the movable piece, the field magnets may be provided in the movable piece, and the armature coil may be provided in the stator.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A linear motor comprising a first part including field magnets and a second part including armature coils, the first part being opposed to the second part, one of the field magnets and the armature coils circumferentially surrounds another of the field magnets and the armature coils;

wherein a first arrangement pattern of the field magnets has a non-zero tilt angle relative to a second arrangement pattern of the armature coils.

2. The linear motor according to claim 1, wherein said first part is operated as a stator comprising a linear array of a plurality of the field magnets having a non-sinusoidal magnetic flux distribution along a longitudinal direction thereof, and said second part is operated as a movable piece.

3. The linear motor according to claim 2, wherein the non-sinusoidal magnetic flux distribution is a trapezoid pattern and the tilt angle is larger than zero and less than $\tan^{-1}(3P/(2R))$ wherein P denotes a pole pitch and R denotes a width of field poles.

4. The linear motor according to claim 2, wherein the non-sinusoidal magnetic flux distribution is a trapezoid pattern and the tilt angle is $\tan^{-1}(P/(n \cdot R))$ wherein P denotes a pole pitch and R denotes a width of field poles.

5. The linear motor according to claim 2, wherein said stator comprises a cylindrical ferromagnetic member made of a material which can be magnetized and having a smooth surface, and a ferromagnetic rod inserted into a central hole of the cylindrical ferromagnetic member, the cylindrical ferromagnetic member being magnetized to form the field poles having alternate polarities.

6. The linear motor according to claim 2, wherein planes including said armature coils are perpendicular to a longitudinal direction of the linear array of said field magnets, and a boundary plane at which a polarity of the field magnets changes has a slope relatively to the planes including said armature coils.

7. The linear motor according to claim 6, wherein the non-sinusoidal magnetic flux distribution is a trapezoid pattern and the tilt angle is larger than zero and less than $\tan^{-1}(3P/(2R))$ wherein P denotes a pole pitch and R denotes a width of field poles.

8. The linear motor according to claim 6, wherein the non-sinusoidal magnetic flux distribution is a trapezoid pattern and the tilt angle is $\tan^{-1}(P/(n \cdot R))$ wherein P denotes a pole pitch and R denotes a width of field poles.

9. The linear motor according to claim 2, wherein a boundary plane at which a polarity of the field magnets changes is perpendicular to a longitudinal direction of the linear array of said field magnets and planes including said armature coils has a slope relatively to thee planes including said armature coils.

10. The linear motor according to claim 9, wherein the non-sinusoidal magnetic flux distribution is a trapezoid pattern and the tilt angle is larger than zero and less than $\tan^{-1}(3P/(2R))$ wherein P denotes a pole pitch and R denotes a width of field poles.

11. The linear motor according to claim 9, wherein the non-sinusoidal magnetic flux distribution is a trapezoid pattern and the tilt angle is $\tan^{-1}(P/(n \cdot R))$ wherein P denotes a pole pitch and R denotes a width of field poles.

12. The linear motor according to claim 2, wherein planes including said armature coils have a first slope relatively to a direction perpendicular to a longitudinal direction of the linear array of said field magnets, and a boundary plane at which a polarity of the field magnets changes has a second slope relatively to a direction perpendicular to a longitudinal direction of the linear array of said field magnets, the second slope being different from the first slope.

13. The linear motor according to claim 12, wherein the non-sinusoidal magnetic flux distribution is a trapezoid pattern and the tilt angle is larger than zero and less than $\tan^{-1}(3P/(2R))$ wherein P denotes a pole pitch and R denotes a width of field poles.

14. The linear motor according to claim 12, wherein the non-sinusoidal magnetic flux distribution is a trapezoid pattern and the tilt angle is $\tan^{-1}(P/(n \cdot R))$ wherein P denotes a pole pitch and R denotes a width of field poles.

15. A single sided servo apparatus comprising a carriage member having a longitudinal shape and a linear motor for driving the carriage member at a first end thereof along a direction perpendicular to a longitudinal direction of the carriage member, the linear motor comprising a first part including field magnets and a second part including armature coils, the first part being opposed to the second part, one of the first and second parts being operated as a stator extending along the width direction, the other thereof being operated as a movable piece moving along the stator, the movable piece being connected to the first end of the carriage member, wherein a first arrangement pattern of the field magnets has an angle relative to a second arrangement pattern of the armature coils so that a thrust is generated for a second end of the carriage member opposite to the first end to precede the first end thereof connected to the linear motor.

16. The single sided servo apparatus according to claim 15, wherein said stator comprises a linear array of a plurality of the field magnets having a non-sinusoidal magnetic flux distribution along a longitudinal direction thereof, and said movable piece comprises the armature coils.

17. A single sided servo apparatus comprising
a carriage member having a longitudinal shape;
a first linear motor for driving the carriage member at a first end thereof along a width direction perpendicular to a longitudinal direction of the longitudinal shape, the first linear motor comprising a first stator including field magnets and a first mobile piece including armature coils, the first stator being opposed to the first mobile piece, the first movable piece being connected to the first end of the carriage member, wherein a first arrangement pattern of the field magnets in the first stator has an angle relative to a second arrangement pattern of the armature coil in the first movable piece so that a thrust is generated for a second end of the carriage member opposite to the first end thereof to precede the first end connected to the linear motor; and
a second linear motor for driving the carriage member at the second end thereof along these width direction, the second linear motor comprising a second stator including field magnets and a second movable piece including armature coils, the second stator being opposed to the second movable piece, the second movable piece being connected to the second end of the carriage member, wherein a third arrangement pattern of the field magnets in the second stator has an angle relative to a fourth arrangement pattern of the armature coil in the second movable piece so that a thrust is generated for the second end of the carriage member to precede the first end thereof.

18. The single sided servo apparatus according to claim 17, wherein said first or second stator comprises a linear array of a plurality of the field magnets having a non-sinusoidal magnetic flux distribution along a longitudinal direction thereof, and said first or second movable piece comprises the armature coils.

19. The linear motor according to claim 1, wherein the one of the first part and the second part circumferentially surrounds another of the first part and the second part by 360°.

20. The linear motor according to claim 1, wherein the first part is operated as a rod-shaped stator and the second part is operated as a cylindrical movable piece that receives the rod-shaped stator.

21. The linear motor according to claim 1, wherein one of the first part and the second part slides along a surface of another of the first part and the second part.

22. The single sided servo apparatus according to claim 15, wherein one of the stator and the movable piece circumferentially surrounds another of the stator and the movable piece.

23. The single sided servo apparatus according to claim 15, wherein the one of the first and second parts is operated as a rod-shaped stator and the other of the first and second parts is operated as a cylindrical movable piece that receives, the rod-shaped stator.

24. The single sided servo apparatus according to claim 15, wherein the other of the first and second parts slides along a surface of the one of the first and second parts.

25. The single sided servo apparatus according to claim 17, wherein one of the first stator and the first movable piece circumferentially surrounds another of the first stator and the first movable piece, and one of the second stator and the second movable piece circumferentially surrounds another of the second stator and the second movable piece.

26. The single sided servo apparatus according to claim 17, wherein one of the first stator and the first movable piece directly supports another of the first stator and the first movable piece, and one of the second stator and the second movable piece supports another of the second stator and the second movable piece.

* * * * *

UNITED STATES PATENT AND TRADEMARK OFFICE
CERTIFICATE OF CORRECTION

PATENT NO. : 5,796,186
DATED : August 18, 1998
INVENTOR(S) : Katsuhiro NANBA et al.

It is certified that error appears in the above-identified patent and that said Letters Patent is hereby corrected as shown below:

On the face of the patent, please add:

-- [30] Foreign Application Priority Data
| | | | |
|---|---|---|---|
| Mar. 31, 1995 | [JP] | Japan | 7-075297 |
| Mar. 13, 1996 | [JP] | Japan | 8-056448 |
| Mar. 25, 1996 | [JP] | Japan | 9-068020 --. |

Signed and Sealed this

Twenty-sixth Day of October, 1999

Attest:

Q. TODD DICKINSON

*Attesting Officer*  *Acting Commissioner of Patents and Trademarks*